United States Patent [19]
Marlor et al.

[11] Patent Number: 5,528,107
[45] Date of Patent: Jun. 18, 1996

[54] LEAD AND ARSENIC FREE, SOLARIZATION RESISTANT GLASS

[76] Inventors: Richard C. Marlor, 77 Lothrop St., Danvers, Mass. 01923; R. Bruce Biddulph, 32 Pine St., Exeter, N.H. 03833

[21] Appl. No.: 414,550

[22] Filed: Mar. 31, 1995

[51] Int. Cl.$^6$ .............................. H01J 5/04; H01J 61/30; C03L 3/04
[52] U.S. Cl. .......................... 313/636; 313/112; 501/55; 501/64; 501/69; 501/70
[58] Field of Search .................................... 313/112, 636, 313/493; 501/55, 64, 66, 68, 69, 70, 72

[56] References Cited

U.S. PATENT DOCUMENTS

| | | | |
|---|---|---|---|
| 3,451,579 | 6/1969 | Bishop | 220/2.1 |
| 4,105,826 | 8/1978 | Thomas | 428/379 |
| 4,459,510 | 7/1984 | Joormann | 313/636 |
| 4,599,319 | 7/1986 | Sack | 501/57 |
| 4,684,847 | 8/1987 | Spierings et al. | 313/493 |
| 5,180,695 | 1/1993 | Weiss et al. | 501/66 |
| 5,270,608 | 12/1993 | Williamson et al. | 313/25 |
| 5,296,294 | 3/1994 | Suzuki et al. | 428/410 |
| 5,308,803 | 5/1994 | Clifford et al. | 501/17 |

Primary Examiner—Nimeshkumar D. Patel
Attorney, Agent, or Firm—William H. McNeill

[57] ABSTRACT

An electric arc discharge lamp having an arc discharge light source which emits both visible light radiation and UV radiation enclosed within an anti-solarization borosilicate glass envelope which is lead and arsenic free and having a transmission of greater than 90% at a wave length of 425 nm and a transmission of not more than 40% of said UV radiation at 320 nm; 8% of said UV radiation at 300 nm; and 0.5% of said UV radiation at 290 nm; said borosilicate glass comprising, in weight percent: from about 3.89% $Na_2O$; about 1.5% $K_2O$; about 0.15% $Li_2O$; about 17% $B_2O_3$; about 1.4% $Al_2O_3$; about 0.6% CaO; about 0.35% MgO; about 0.15% $CeO_2$; from about 0.075% to about 0.30% $SnO_2$; and the balance $SiO_2$. Also, a glass having the above composition.

5 Claims, 1 Drawing Sheet

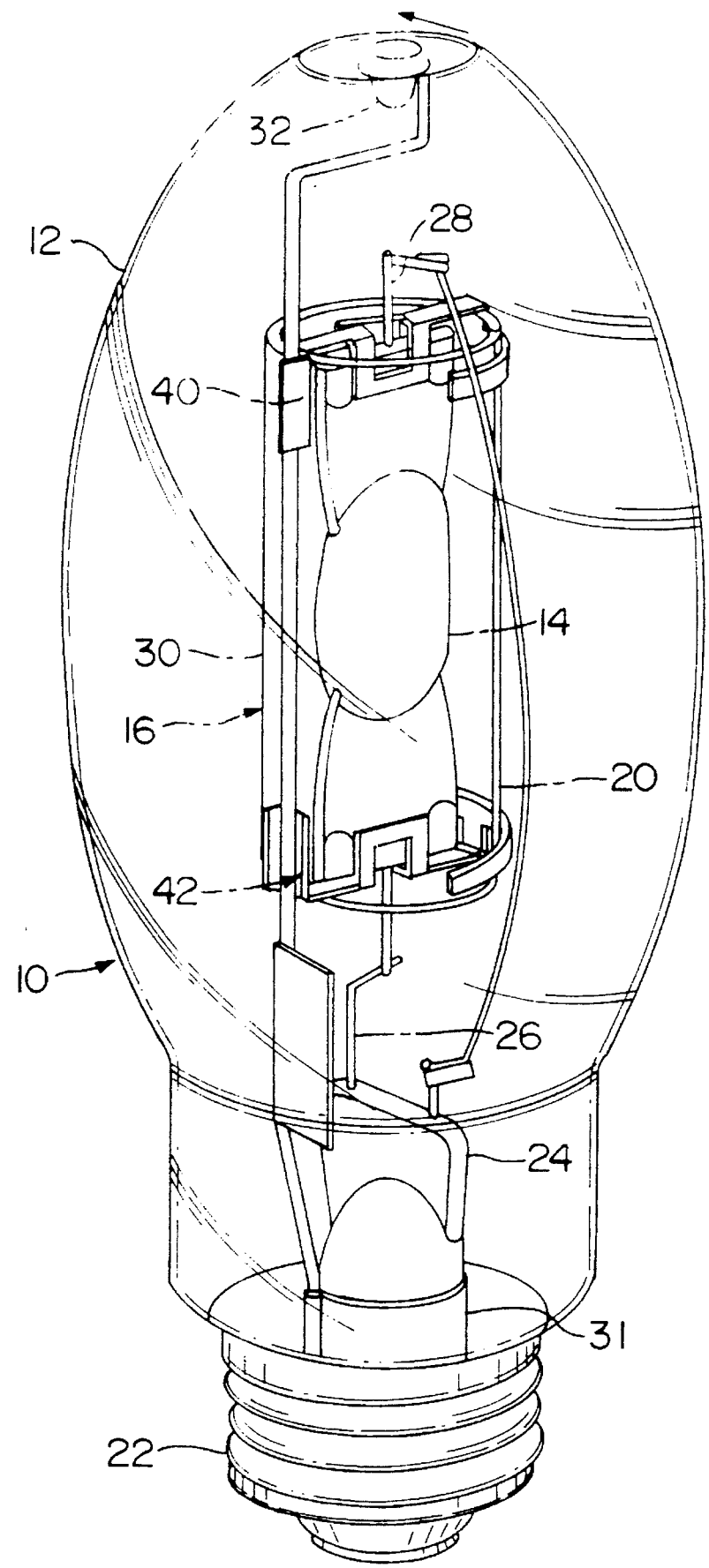

LEAD AND ARSENIC FREE, SOLARIZATION RESISTANT GLASS

TECHNICAL FIELD

This invention relates to glasses and more particularly to glasses for use with electric lamps and still more particularly to glasses for use with lamps that generate undesirable amounts of ultraviolet (UV) radiation.

BACKGROUND ART

Ultraviolet absorbing glass compositions for electric lamps such as high intensity discharge lamps, typically contain either lead and arsenic oxides or lead and cerium oxides. Both lead and arsenic are toxic materials and it would be very advantageous to be able to manufacture acceptable glasses without using these materials. Arsenic oxide is generally employed in glass compositions as a fining agent for glasses which are difficult to fine (i.e., removal of bubbles). Ceria has been used as a substitute for arsenic oxide and it is a superior fining agent for borosilicate glasses. However, in order to use ceria-containing borosilicate glass compositions in the manufacture of outer jackets for high intensity discharge lamps, it has been found necessary to include lead oxide to prevent solarization of the ceria. Absent the lead, it has been found that ceria will produce light absorbing centers upon UV irradiation. These light absorbing centers darken the outer jacket and seriously reduce the light output. Elimination of the lead and arsenic oxides has produced workable glasses with adequate sealing capabilities to tungsten; however, such glasses (for example, Schott 8487, which is used in Europe for lamp stems and tubulations) do not absorb sufficiently in the UV region to be used as outer envelopes, thus necessitating two types of glass, one for the stem and tubulation and one for the outer jacket. As an illustration, the Schott glass enumerated above has a transmittance of 23% @ 300 nm, whereas open fixtured lamps employed in the United States must meet the requirements of UL1572 Specification which requires a transmittance of no more than 8% @ 300 nm. Additionally, to be an acceptable glass for use as the outer jacket of high intensity discharge lamps, any absorption at wavelengths approaching the visible, say, above about 375 nm, must be minimized.

DISCLOSURE OF THE INVENTION

It is, therefore, an object of the invention to obviate the disadvantages of the prior art. It is another object of the invention to produce a single glass having the sealing ability to bond to tungsten for utilization as stem glass and the ability to absorb UV without undue solarization effects so that it can be used as an outer jacket glass for high intensity discharge lamps.

It is another object of the invention to enhance the operation of high intensity discharge lamps.

Yet another object of the invention is the provision of a lead oxide free and arsenic oxide free glass to accomplish the above results.

These objects are accomplished, in one aspect of the invention, by the provision of an electric arc discharge lamp having an arc discharge light source which emits both visible light radiation and UV radiation and which light source is enclosed within a borosilicate glass envelope having a transmission of greater than 90% at a wave length of 425 nm and a transmission of not more than 49% of said UV radiation at 320 nm; 8% of said UV radiation at 300 nm; and 0.5% of said UV radiation at 290 nm; said borosilicate glass comprising, in weight percent: from about 3.89% $Na_2O$; about 1.5% $K_2O$; about 0.15% $Li_2O$; about 17% $B_2O_3$; about 1.4% $Al_2O_3$; about 0.6% CaO; about 0.35% MgO; about 0.15% $CeO_2$; from about 0.075% to about 0.15% $SnO_2$; and the balance $SiO_2$.

The inclusion of the stannous oxide reduces the tendency for ceria to solarize, thus providing a lead-free, arsenic-free, UV-absorbing, solarization glass for use with electric lamps such as high intensity discharge devices. The glass has a thermal expansion matching that of tungsten. Therefore, it can be used as the stem glass as well as the outer jacket glass.

BRIEF DESCRIPTION OF THE DRAWINGS

The single figure illustrates a lamp employing the invention.

BEST MODE FOR CARRYING OUT THE INVENTION

For a better understanding of the present invention, together with other and further objects, advantages and capabilities thereof, reference is made to the following disclosure and appended claims taken in conjunction with the above-described drawing.

Referring now to the drawing with greater particularity, there is shown an electric lamp 10 in the form of a high intensity discharge lamp. The lamp 10 includes an outer jacket 12 constructed of a glass according to the invention and has an arc tube 14 mounted therein by mounting means 16. The arc tube 14 may be surrounded by a shroud 20 which can be formed of the same glass as the outer jacket. Alternatively, the shroud can be a heat resistant material such as quartz. The shroud can also be supported within the lamp 10 by the mounting means 16.

Electrical energy is coupled to the arc tube 14 through a base 22, a lamp stem 24 and electrical lead-ins 26 and 28. The mounting means 16 supports both the arc tube 14 and the shroud 20. The mounting means 16 includes a metal support rod 30 attached to the stem 24 by a strap 31. The support rod 30 engages an inward projection 32 in the upper end of the lamp envelope 12. The support rod 30 in its central portion is parallel to a central axis of arc tube 14 and shroud 20. The mounting means 16 further includes an upper clip 40 and a lower clip 42 which secure both the arc tube 14 and the shroud 20 to support rod 30. The clips 40 and 42 are attached to support rod 30, preferably by welding. Further details of this construction can be found in U.S. Pat. No. 5,270,608, the pertinent teachings of which are incorporated by reference..

The following non-limiting examples illustrate glasses of the invention:

EXAMPLE I

A composition comprising, in weight percent from about 3.89% $Na_2O$; about 1.5% $K_2O$; about 0.15% $Li_2O$; about 17% $B_2O_3$; about 1.4% $Al_2O_3$; about 0.6% CaO; about 0.35% MgO; about 0.15% $CeO_2$; about 0.15% $SnO_2$; and the balance $SiO_2$.

When compared to a base glass having the above-composition with no $SnO_2$ and the above composition with the $SnO_2$, the following transmittances were observed at the designated wavelengths for the unsolarized and solarized versions:

TABLE I

|  | 350 nm | 375 nm | 400 nm | 425 nm |
| --- | --- | --- | --- | --- |
| Base Glass [0.15 wt % CeO2] | | | | |
| Unsolarized | 80% | 89% | 91% | 92% |
| Solarized | 55% | 76% | 86% | 89% |
| AS12 [0.15 wt % CeO2/ 0.15 wt % SnO2] | | | | |
| Unsolarized | 88% | 90% | 91% | 92% |
| Solarized | 67% | 82% | 89% | 92% |

The solarization was carried out by exposing the glass to radiation from a special 2000 watt, unjacketed reprographic lamp, operated at 1000 watts (type MP2000 T8/4J, at a distance of 4 inches, for 502 hours). Such a lamp is available from Osram Sylvania Inc. Danvers, Mass. 01923

EXAMPLE II

The composition of Example I except that the amount of $SnO_2$ was reduced to 0.075 weight percent.

When compared to a base glass having the composition of Example II, with no $SnO_2$ and the above composition with the $SnO_2$, the transmittances shown in Table II were observed at the designated wavelengths for the unsolarized and solarized versions:

TABLE II

|  | 350 nm | 375 nm | 400 nm | 425 nm |
| --- | --- | --- | --- | --- |
| Base Glass [0.15 wt % CeO2] | | | | |
| Unsolarized | 80% | 89% | 91% | 92% |
| Solarized | 55% | 76% | 86% | 89% |
| AS17 [0.15 wt % CeO2/ [0.075 wt % SnO2] | | | | |
| Unsolarized | 88% | 91% | 92% | 92% |
| Solarized | 64% | 81% | 89% | 92% |

EXAMPLE III

The composition of Example I except that the amount of $SnO_2$ was raised to 0.30 weight percent.

When compared to a base glass having the composition of Example III with no $SnO_2$ and the above composition with the $SnO_2$, the transmittances shown in Table III were observed at the designated wavelengths for the unsolarized and solarized versions.

TABLE III

|  | 350 nm | 375 nm | 400 nm | 425 nm |
| --- | --- | --- | --- | --- |
| Base Glass [0.15 wt % CeO2] | | | | |
| Unsolarized | 80% | 89% | 91% | 92% |
| Solarized | 55% | 76% | 86% | 89% |
| AS 18 [0.15% CeO2/ 0.30% SnO2] | | | | |
| Unsolarized | 88% | 91% | 92% | 92% |
| Solarized | 68% | 82% | 89% | 92% |

Accordingly, there is provided an anti-solarization glass that is lead free and arsenic free and that is suitable for use in electric lamps as a sole glass for stems as well as outer jackets.

While there have been shown and described what are at present considered the preferred embodiments of the invention, it will be apparent to those skilled in the art that various changes and modifications can be made herein without departing from the scope of the invention as defined by the appended claims.

What is claimed is:

1. A lead-free, arsenic-free, solarization resistant borosilicate glass comprising, in weight percent: from about 3.89% $Na_2O$; about 1.5% $K_2O$; about 0.15% $Li_2O$; about 17% $B_2O_3$; about 1.4% $Al_2O_3$; about 0.6% CaO; about 0.35% MgO; about 0.15% $CeO_2$; from about 0.075% to about 0.30% $SnO_2$; and the balance $SiO_2$.

2. The glass of claim 1 wherein said $CeO_2$ is present at 0.15% and said $SnO_2$ is present at 0.15%.

3. The glass of claim 1 wherein said $CeO_2$ is present at 0.15% and said $SnO_2$ is present at 0.075%.

4. The glass of claim 1 wherein said $CeO_2$ is present at 0.15% and said $SnO_2$ is present at 0.30%.

5. An electric arc discharge lamp having an arc discharge light source which emits both visible light radiation and UV radiation enclosed within a borosilicate glass envelope having a transmission of greater than 90% at a wave length of 425 nm and a transmission of not more than 40% of said UV radiation at 320 nm; 8% of said UV radiation at 300 nm; and 0.5% of said UV radiation at 290 nm; said borosilicate glass comprising, in weight percent: from about 3.89% $Na_2O$; about 1.5% $K_2O$; about 0.15% $Li_2O$; about 17% $B_2O_3$; about 1.4% $Al_2O_3$; about 0.6% CaO; about 0.35% MgO; from about 0.15% to about 0.25% $CeO_2$; from about 0.075% to about 0.30% $SnO_2$; and the balance $SiO_2$.

* * * * *